US012794325B2

(12) United States Patent
Shin et al.

(10) Patent No.: US 12,794,325 B2
(45) Date of Patent: Nov. 10, 2026

(54) APPARATUS AND METHOD FOR ASSEMBLING ROTOR FOR DRIVE MOTOR

(71) Applicants: HYUNDAI MOTOR COMPANY, Seoul (KR); KIA CORPORATION, Seoul (KR)

(72) Inventors: Jongho Shin, Siheung-si (KR); Sugil Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 543 days.

(21) Appl. No.: 18/380,354

(22) Filed: Oct. 16, 2023

(65) Prior Publication Data

US 2024/0235339 A1 Jul. 11, 2024

(30) Foreign Application Priority Data

Jan. 10, 2023 (KR) ........................ 10-2023-0003428

(51) Int. Cl.

| | |
|---|---|
| ***H02K 15/02*** | (2025.01) |
| ***B23P 19/02*** | (2006.01) |
| ***H02K 1/276*** | (2022.01) |
| ***H02K 15/03*** | (2006.01) |
| ***H02K 15/10*** | (2025.01) |

(52) U.S. Cl.

CPC .............. *H02K 15/03* (2013.01); *B23P 19/02* (2013.01); *H02K 1/2773* (2013.01)

(58) Field of Classification Search

CPC ......... B23P 19/02; H02K 15/02; H02K 15/03; H02K 1/2773

See application file for complete search history.

(56) References Cited

U.S. PATENT DOCUMENTS

| | | | | |
|---|---|---|---|---|
| 9,762,097 | B2 * | 9/2017 | Kato | H02K 1/2733 |
| 11,296,563 | B2 * | 4/2022 | Nose | B21D 28/26 |
| 11,855,497 | B2 * | 12/2023 | Ohori | H02K 1/278 |
| 2019/0386529 | A1 * | 12/2019 | Nose | B21D 28/26 |
| 2023/0261534 | A1 * | 8/2023 | Suzuki | H02K 1/278 310/156.22 |

* cited by examiner

*Primary Examiner* — Paul D Kim

(74) *Attorney, Agent, or Firm* — MCDONNELL BOEHNEN HULBERT & BERGHOFF LLP

(57) ABSTRACT

An apparatus for assembling a rotor for a drive motor is configured to press-fit, to a shaft, a plurality of rotor core modules, each of which has a plurality of stacked electrical steel sheets. The rotor may include a frame, a shaft fixing unit installed to the frame to fix the shaft along a vertical direction, an elevation plate having a through-hole formed to allow the shaft and the plurality of rotor core modules to pass therethrough along the vertical direction, and installed to the frame to be movable in the vertical direction, a core gripper, a main vision sensor, a core rotating unit connected to the core gripper, and a core press-fitting unit installed to the frame to press-fit the at least one rotor core module to the shaft along an axial direction.

20 Claims, 18 Drawing Sheets

410

APPARATUS AND METHOD FOR ASSEMBLING ROTOR FOR DRIVE MOTOR

CROSS REFERENCE TO RELATED APPLICATIONS

This application claims priority to and the benefit of Korean Patent Application No. 10-2023-0003428 filed in the Korean Intellectual Property Office on Jan. 10, 2023, the entire contents of which are incorporated herein by reference.

BACKGROUND

(a) Field

An exemplary embodiment of the present disclosure relates to an assembly system for a drive motor for a vehicle. More particularly, an exemplary embodiment of the present disclosure relates to an apparatus and method for assembling a rotor for a drive motor for assembling a rotor of a drive motor.

(b) Description of the Related Art

In recent years, environmental pollution problems and efforts to develop alternative energy sources have led to steady progress in development of eco-friendly vehicles. Examples of the eco-friendly vehicles include hybrid vehicles, electric vehicles, hybrid electric vehicles, and hydrogen-powered vehicles (commonly referred to as "hydrogen electric vehicles" by one skilled in the art).

A motor (hereinafter, referred to as a 'drive motor') is a power source for obtaining rotational force with electric energy, instead of an internal combustion engine such as a conventional engine.

The drive motor has a stator and a rotor. The rotor is arranged with a predetermined air gap from the stator and may be rotated about a shaft. Such a rotor, in an example, has a rotor core coupled with a shaft.

Furthermore, a skew structure is applied to the rotor core to reduce cogging torque. In a rotor core press-fitting process, each of a plurality of rotor core modules described above is assembled on the shaft while being staggered at predetermined angles.

Therefore, in order to apply the skew structure to the rotor core, it is necessary to process keys on the plurality of rotor core modules and to process key grooves on the shaft, which may lead to increases in the number of manufacturing processes and the facility investment cost of the rotor core.

Furthermore, when designing a rotor core with a skew structure, a phase difference between a key and a permanent magnet insertion hole must be considered, which increases the complexity of the design and the difficulty in assembling the rotor core and makes it difficult to commonly use the rotor core for each type of drive motor.

The matters described in the background art section are prepared to enhance understanding of the background of the disclosure, and may include matters that have not been known to one skilled in the art to which the present technology belongs.

SUMMARY

Exemplary embodiments of the present disclosure provide an apparatus and method for assembling a rotor for a drive motor by which skew angles are automatically assigned to a plurality of rotor core modules and the plurality of rotor core modules can be press-fitted to a shaft.

An apparatus for assembling a rotor for a drive motor according to an exemplary embodiment of the present disclosure configured to press-fit, to a shaft, a plurality of rotor core modules each of which has a plurality of stacked electrical steel sheets may include i) a frame, ii) a shaft fixing unit installed to the frame to fix the shaft along a vertical direction, iii) an elevation plate having a through-hole formed to allow the shaft and the plurality of rotor core modules to pass therethrough along the vertical direction, and installed to the frame to be movable in the vertical direction, iv) a core gripper installed to the elevation plate to grip and ungrip at least one rotor core module loaded to an upper portion of the shaft, v) a main vision sensor installed to the elevation plate to vision-photograph the at least one rotor core module, vi) a core rotating unit connected to the core gripper and installed to the elevation plate to rotate the at least one rotor core module at a set skew angle according to vision data from the main vision sensor, and vii) a core press-fitting unit installed to the frame to press-fit the at least one rotor core module to the shaft along an axial direction.

In addition, the apparatus for assembling a rotor for a drive motor according to an exemplary embodiment of the present disclosure may further include a controller configured to analyze the vision data acquired from the main vision sensor and to apply a control signal to the core rotating unit.

Further, in the apparatus for assembling a rotor for a drive motor according to an exemplary embodiment of the present disclosure, the shaft fixing unit may include a shaft support member installed to the frame at a position corresponding to the through-hole of the elevation plate, and a shaft fixing pin installed to the frame to be reciprocally movable and configured to couple to a pin groove formed on an outer circumferential surface of the shaft.

Further, in the apparatus for assembling a rotor for a drive motor according to an exemplary embodiment of the present disclosure, the shaft fixing pin may include a tapered portion to be fitted into the pin groove.

Further, in the apparatus for assembling a rotor for a drive motor according to an exemplary embodiment of the present disclosure, the shaft fixing unit may further include a pair of clampers installed to the frame to be reciprocally movable so as to clamp the shaft coupled to the shaft support member.

Further, the apparatus for assembling a rotor for a drive motor according to an exemplary embodiment of the present disclosure may further include a sub-vision sensor installed to the elevation plate, and configured to vision-photograph a resolver groove formed on the upper portion of the shaft and to output vision data to the controller.

Further, in the apparatus for assembling a rotor for a drive motor according to an exemplary embodiment of the present disclosure, a plurality of guide rods may be installed to the frame along the vertical direction.

Further, in the apparatus for assembling a rotor for a drive motor according to an exemplary embodiment of the present disclosure, a pair of movable blocks may be coupled to be movable in the vertical direction to the plurality of guide rods.

Further, in the apparatus for assembling a rotor for a drive motor according to an exemplary embodiment of the present disclosure, the elevation plate may be coupled with the pair of movable blocks.

Further, in the apparatus for assembling a rotor for a drive motor according to an exemplary embodiment of the present disclosure, each of the pair of movable blocks may be connected to an elevation cylinder installed to the frame along the vertical direction.

Further, in the apparatus for assembling a rotor for a drive motor according to an exemplary embodiment of the present disclosure, the core gripper may include a pair of lower grippers installed to the core rotating unit to be reciprocally movable so as to grip a lower portion of the at least one rotor core module, and a pair of side grippers installed to the core rotating unit to be reciprocally movable so as to grip an outer periphery of the at least one rotor core module.

Further, in the apparatus for assembling a rotor for a drive motor according to an exemplary embodiment of the present disclosure, each of the pair of lower grippers may include a plurality of core supports formed in a step shape along the vertical direction.

Further, in the apparatus for assembling a rotor for a drive motor according to an exemplary embodiment of the present disclosure, the main vision sensor may be fixed to a mounting bracket installed to the elevation plate.

Further, in the apparatus for assembling a rotor for a drive motor according to an exemplary embodiment of the present disclosure, the main vision sensor may be installed to a mounting bracket coupled to the elevation plate to be movable along the vertical direction.

Further, in the apparatus for assembling a rotor for a drive motor according to an exemplary embodiment of the present disclosure, the core rotating unit may include a ring-shaped turning gear rotatably coupled to an edge portion of the through-hole of the elevation plate and connected to the core gripper, and a drive gear installed to the elevation plate to be rotatable by driving of a servo motor and configured to be in mesh (i.e., interlock) with the turning gear.

Further, in the apparatus for assembling a rotor for a drive motor according to an exemplary embodiment of the present disclosure, the core press-fitting unit may include a hollow-shaped press-fitting rod installed to the frame to be movable in the vertical direction at a position corresponding to the axial direction of the shaft, a press-fitting head coupled to a lower portion of the press-fitting rod to press-fit the at least one rotor core module to the shaft, and a press-fitting press installed to the frame and connected to the press-fitting rod.

Further, in the apparatus for assembling a rotor for a drive motor according to an exemplary embodiment of the present disclosure, the press-fitting rod may be configured to be synchronized with the elevation plate by driving of the press-fitting press and to be movable downward.

Further, the apparatus for assembling a rotor for a drive motor according to an exemplary embodiment of the present disclosure may further include an inspection vision sensor configured to vision-photograph outer circumferential surfaces of the plurality of rotor core modules press-fitted to the shaft and to output vision data to a controller.

Further, the apparatus for assembling a rotor for a drive motor according to an exemplary embodiment of the present disclosure may further include a sensor unit installed to the core press-fitting unit to sense a position of the at least one rotor core module.

Further, in the apparatus for assembling a rotor for a drive motor according to an exemplary embodiment of the present disclosure, the sensor unit may be installed to the press-fitting head.

Further, in the apparatus for assembling a rotor for a drive motor according to an exemplary embodiment of the present disclosure, the sensor unit may include a plurality of pin members installed to the press-fitting head to be movable in the vertical direction.

Further, in the apparatus for assembling a rotor for a drive motor according to an exemplary embodiment of the present disclosure, the sensor unit may include a plurality of springs each mounted to each of the plurality of pin members to exert elastic force on the plurality of pin members through the press-fitting head.

Further, in the apparatus for assembling a rotor for a drive motor according to an exemplary embodiment of the present disclosure, the sensor unit may include a plurality of displacement sensors installed to the press-fitting head to sense displacement of the plurality of pin members and to output a sensing signal to a controller.

Further, in the apparatus for assembling a rotor for a drive motor according to an exemplary embodiment of the present disclosure, the controller may be configured to analyze the sensing signals obtained from the plurality of displacement sensors to extract position values of a plurality of tooling holes formed in the at least one rotor core module, and to compare the position values with a preset reference value to determine whether the at least one rotor core module is located at a predetermined position.

A rotor assembling method using the apparatus for assembling a rotor for a drive motor according to an exemplary embodiment of the present disclosure as described above may include (a) a process of fixing a shaft through a shaft fixing unit, (b) a process of loading at least one rotor core module to an upper portion of the shaft, (c) a process of gripping the at least one rotor core module through a core gripper, (d) a process of vision-photographing the at least one rotor core module through a main vision sensor, (e) a process of rotating the at least one rotor core module at a set skew angle through a core rotating unit, based on vision data from the main vision sensor, and (f) a process of press-fitting the at least one rotary core module to the shaft through a core press-fitting unit.

In addition, in the rotor assembling method according to an exemplary embodiment of the present disclosure, in the process (a), the shaft may be coupled to a shaft support member, and the shaft may be fixed through a shaft fixing pin and a pair of clampers.

Further, in the rotor assembling method according to an exemplary embodiment of the present disclosure, in the process (c), a lower portion of the at least one rotor core module may be gripped through a pair of lower grippers.

Further, in the rotor assembling method according to an exemplary embodiment of the present disclosure, in the process (c), an outer periphery of the at least one rotor core module may be gripped through a pair of side grippers.

Further, in the rotor assembling method according to an exemplary embodiment of the present disclosure, in the process (d), the main vision sensor may be configured to output vision data to a controller.

Further, in the rotor assembling method according to an exemplary embodiment of the present disclosure, in the process (e), the controller may be configured to compare the vision data obtained from the main vision sensor with preset reference data to calculate a position value of the at least one rotor core module, and to apply a position control signal to which the position value of the at least one rotor core module is reflected to a servo motor of the core rotating unit.

Further, in the rotor assembling method according to an exemplary embodiment of the present disclosure, in the process (f), a press-fitting rod and a press-fitting head of the core press-fitting unit may be configured to move downward to press-fit the at least one rotor core module to the shaft.

Further, in the rotor assembling method according to an exemplary embodiment of the present disclosure, in the process (f), an elevation plate for which the core gripper, the main vision sensor and the core rotating unit are configured is configured to synchronize with the core press-fitting unit, and to move downward.

Since the exemplary embodiments of the present disclosure assemble the rotor core from which a key structure is deleted to the shaft, it is possible to reduce the number of manufacturing processes of the rotor core and the facility investment cost.

Further, the exemplary embodiments of the present disclosure can simplify the design and assembly of the rotor core, and can share the rotor core for each type of drive motor.

In addition, the effects that can be obtained or expected by the exemplary embodiments of the present disclosure will be directly or implicitly disclosed in the detailed description of the exemplary embodiments of the present disclosure. That is, various effects that may be expected by the exemplary embodiments of the present disclosure will be disclosed in the detailed description described below.

BRIEF DESCRIPTION OF THE FIGURES

Since the accompanying drawings are for reference in describing exemplary embodiments of the present disclosure, the technical spirit of the present disclosure should not be construed as being limited to the accompanying drawings.

It should be understood that the above-referenced drawings are not necessarily drawn to scale, and present rather simplified representations of various preferred features illustrating the basic principles of the present disclosure. The specific design features of the present disclosure, including, for example, specific dimensions, orientations, locations, and shapes, will be determined in part by the specific intended application and use environment.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The terminology used herein is for the purpose of describing specific exemplary embodiments only and is not intended to be limiting the present disclosure. As used herein, the singular forms are intended to include the plural forms as well, unless the context clearly indicates otherwise.

It will be further understood that the terms “comprise” and/or “comprising” when used in this specification specify the presence of stated features, integers, steps, operations, elements and/or components, but do not preclude the presence or addition of one or more other features, integers, steps, operations, components, and/or groups thereof. As used herein, the term “and/or” includes any one or all combinations of one or more of associated listed items.

In addition, in this specification, the term “coupled” indicates a physical relationship between two components in which the components are directly connected to each other or indirectly connected through one or more intermediate components.

In this specification, ‘operably connected’ or a term similar thereto means that at least two members are directly or indirectly connected to each other to transmit power. However, two operably connected members do not always rotate at the same speed and in the same direction.

Further, as used herein, “vehicle”, “vehicular”, “automobile” or other similar terms as used herein generally refer to passenger automobiles including passenger vehicles, sport utility vehicles (SUVs), buses, trucks, and various commercial vehicles, and furthermore, may refer to, as eco-friendly vehicles, hybrid vehicles, electric vehicles, hybrid electric vehicles, electric vehicle-based PBV vehicles (Purpose Built Vehicles), and hydrogen-powered vehicles.

Hereinafter, exemplary embodiments of the present disclosure will be described in detail with reference to the accompanying drawings.

Figure 1:
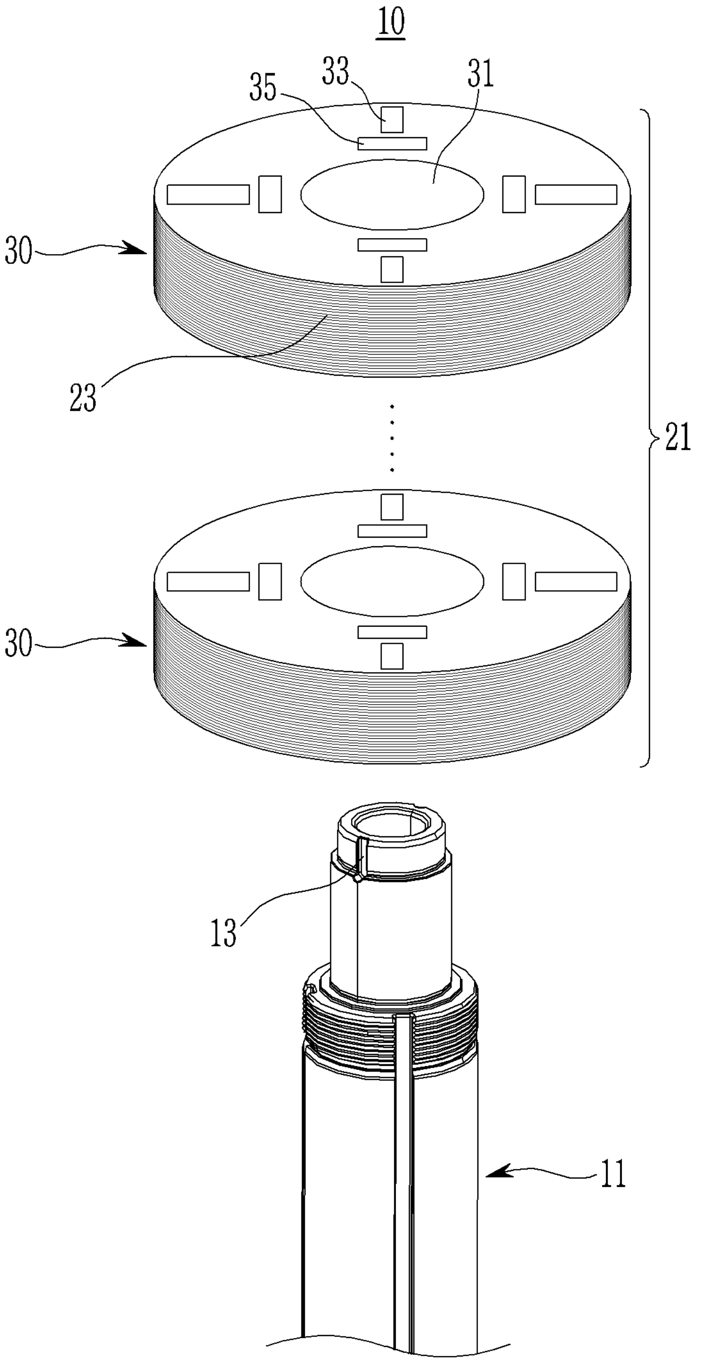
FIG. 1 is a view showing an example of a rotor applied to an apparatus for assembling a rotor for a drive motor according to an exemplary embodiment of the present disclosure.

FIG. 1 is a view showing an example of a rotor applied to an apparatus for assembling a rotor for a drive motor according to an exemplary embodiment of the present disclosure.

Referring to FIG. 1, an exemplary embodiment of the present disclosure may be applied to a process of manufacturing a drive motor for an eco-friendly vehicle that obtains drive force by electric energy.

For example, the drive motor may include a permanent magnet synchronous motor (PMSM) using a rare earth permanent magnet. Such a drive motor may include a stator (not shown), a rotor 10 arranged with a predetermined air gap on an inner side of the stator, and a plurality of permanent magnets (not shown) inserted into the rotor 10.

In the above, the rotor 10 includes a shaft 11 serving as a drive shaft and a rotor core 21 press-fitted to the shaft 11.

In an example, the shaft 11 may be a hollow shaft. An upper portion of the shaft 11 is formed with a resolver groove 13 along a vertical direction. The rotor core 21 includes electrical steel sheets 23 stacked in multiple sheets.

Furthermore, the rotor core 21 may be divided into a plurality of rotor core modules 30 each of which has a plurality of stacked electrical steel sheets 23 having the same shape. The plurality of rotor core modules 30 are press-fitted to the shaft 11 at a set skew angle, and may be configured into the rotor core 21 described above.

Here, each of the plurality of rotor core modules 30 includes a shaft insertion hole 31 to which the shaft 11 is coupled, a plurality of magnet insertion holes 33 to which a plurality of permanent magnets are coupled, and a plurality of tooling holes 35.

As described above, the exemplary embodiment of the present disclosure has been described as being applied to the rotor 10 for a drive motor for an eco-friendly vehicle, but it should not be understood that the scope of protection of the present disclosure is necessarily limited thereto. For example, the technical spirit of the present disclosure may be applied to a rotor for a drive motor as long as it has various types and uses.

Figure 2:
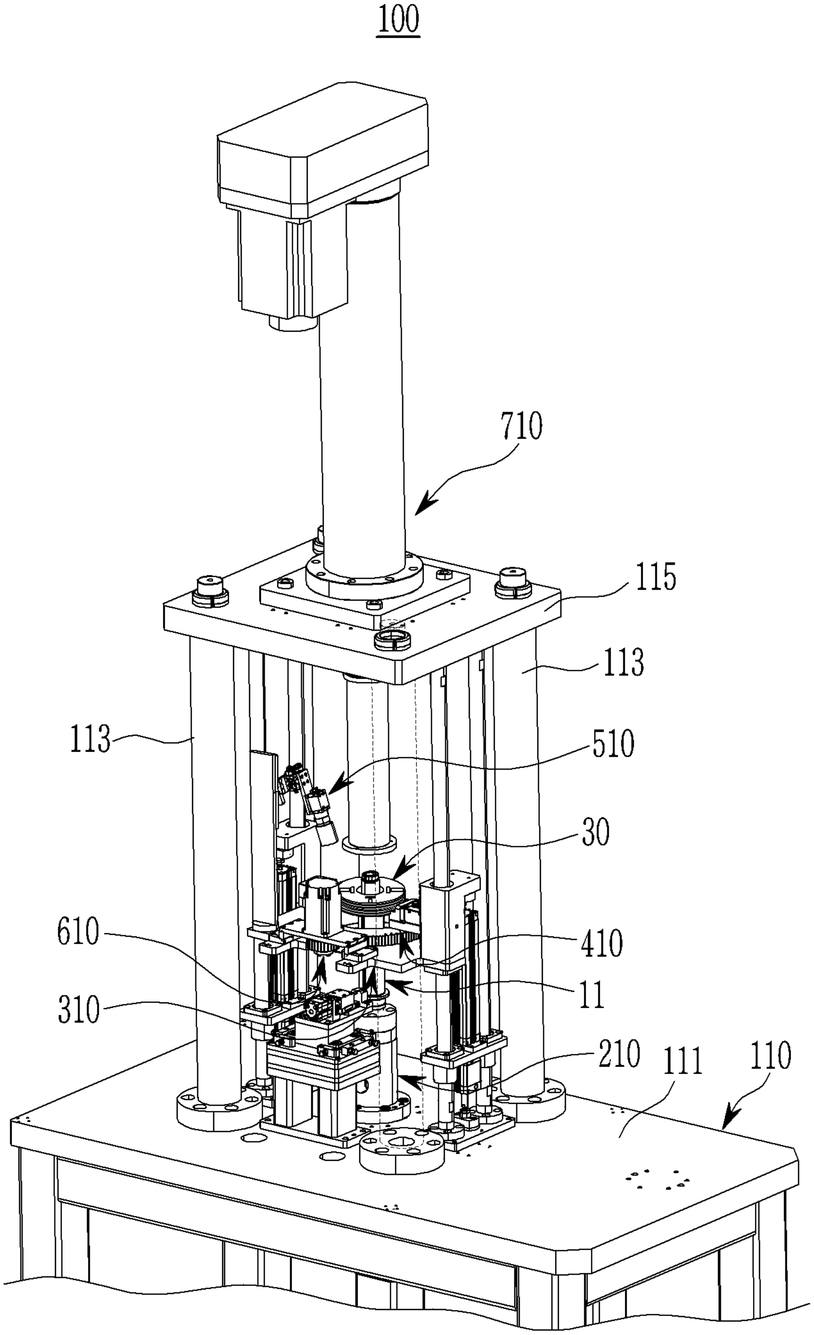
FIGS. 2 and 3 are perspective views showing the apparatus for assembling a rotor for a drive motor according to the exemplary embodiment of the present disclosure.
Figure 3:
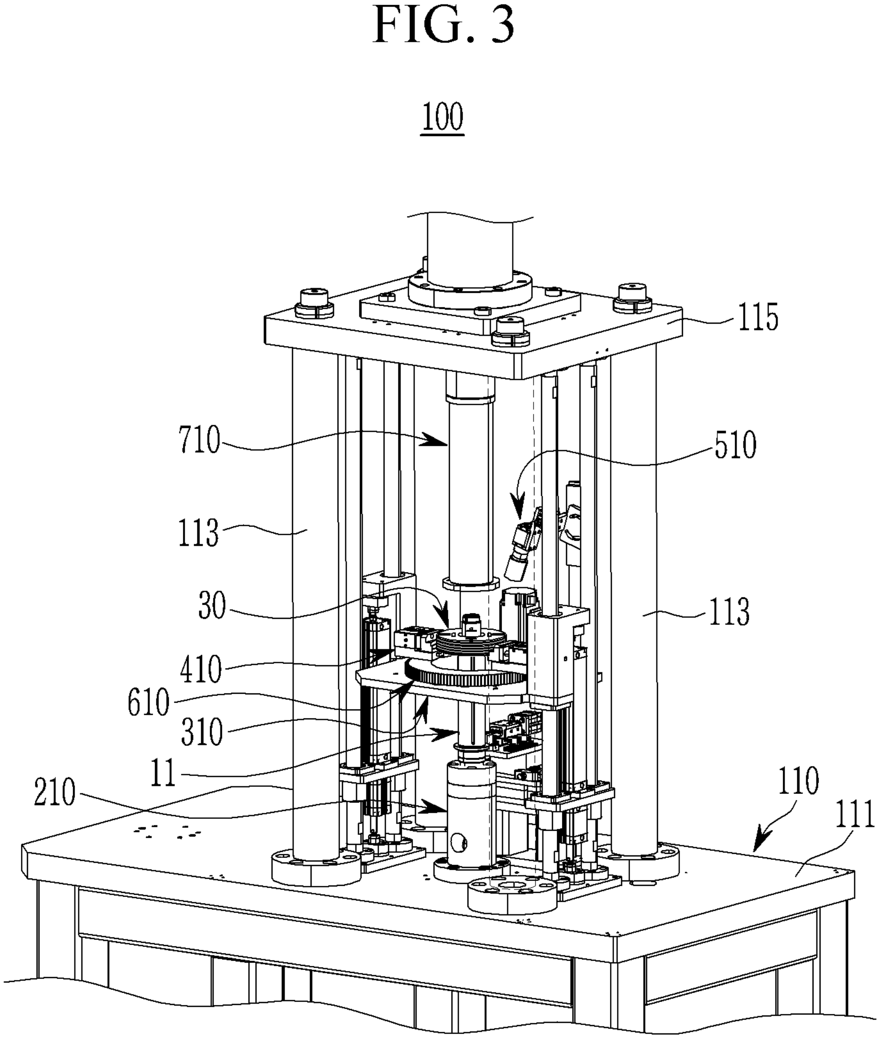
Figure 4:
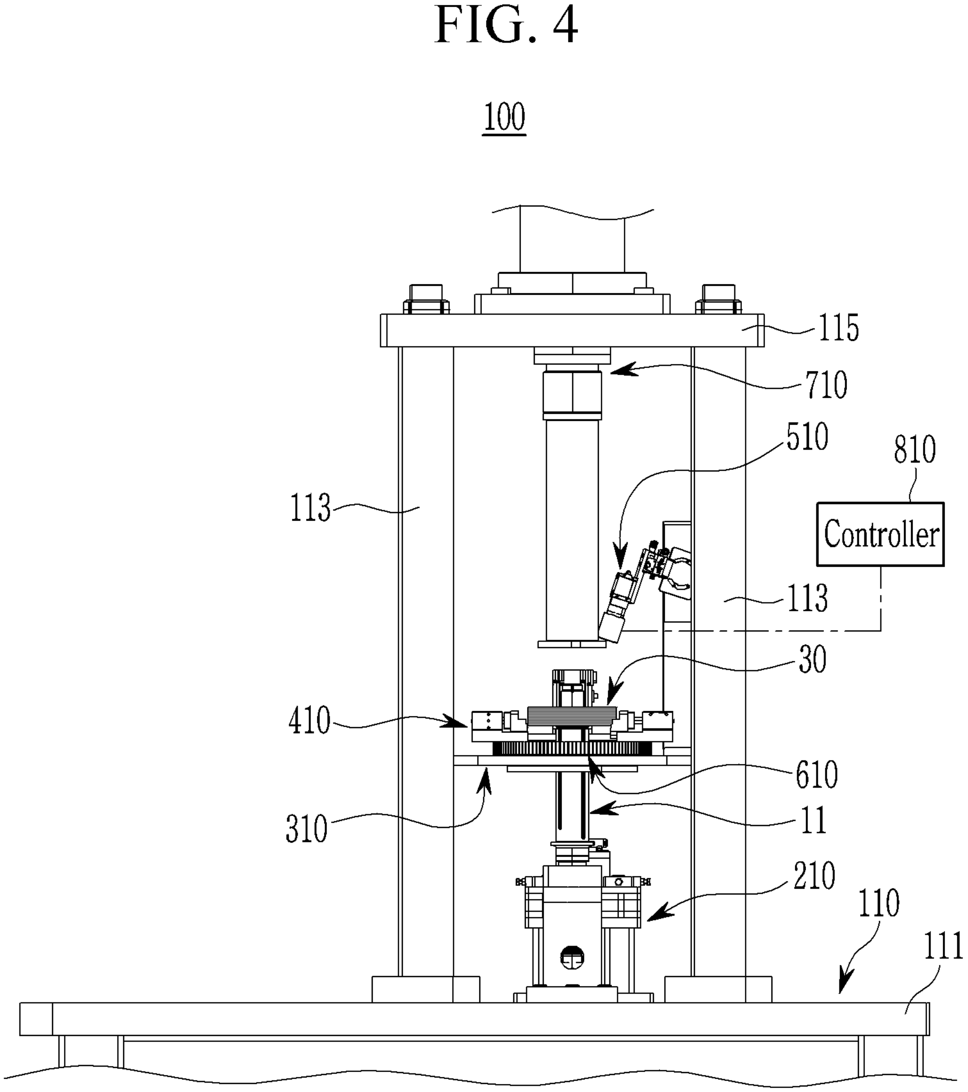
FIG. 4 is a side view showing the apparatus for assembling a rotor for a drive motor according to the exemplary embodiment of the present disclosure.

FIGS. 2 and 3 are perspective views showing the apparatus for assembling a rotor for a drive motor according to the exemplary embodiment of the present disclosure. FIG. 4 is a side view showing the apparatus for assembling a rotor for a drive motor according to the exemplary embodiment of the present disclosure.

Referring to FIGS. 2 to 4, an apparatus 100 for assembling a rotor for a drive motor according to the exemplary embodiment of the present disclosure may be applied to a process of manufacturing a rotor 10 for a drive motor (hereinafter, refer to FIG. 1).

Furthermore, the apparatus 100 for assembling a rotor for a drive motor according to the exemplary embodiment of the present disclosure may be applied to a core press-fitting process of sequentially press-fitting the plurality of rotor core modules 30 to the shaft 11 among rotor manufacturing processes.

In the present specification, reference directions for describing the following constitutional elements may be set to front, rear, left-right direction, and vertical direction, based on the drawings.

In addition, in the present specification, 'upper end portion', 'upper portion', 'upper end' or 'upper surface' of a constitutional element indicates an end portion, a portion, an end, or a surface of a constitutional element located on a relatively upper side in the drawing, and 'lower end portion', 'lower portion', 'lower end' or 'lower surface' of a constitutional element indicates an end portion, a portion, an end, or a surface of a constitutional element located on a relatively lower side in the drawing.

Furthermore, in the present specification, an end of a constitutional element (e.g., one-side end or other-side end, etc.) refers to an end of a constitutional element in any one direction, and an end portion of a constitutional element (e.g., one-side end portion or other-side end portion, etc.) indicates a certain portion of a constitutional element that includes the end.

The apparatus 100 for assembling a rotor for a drive motor according to the exemplary embodiment of the present disclosure may omit a key structure for applying a skew angle to the rotor core 21 (refer to FIG. 1), and has a structure that can automatically assign skew angles to the plurality of rotor core modules 30 and press-fit the plurality of rotor core modules 30 to the shaft 11.

To this end, the apparatus 100 for assembling a rotor for a drive motor according to the exemplary embodiment of the present disclosure includes a frame 110, a shaft fixing unit 210, an elevation plate 310, a core gripper 410, a main vision sensor 510, a core rotating unit 610, a core press-fitting unit 710, and a controller 810.

Referring to FIGS. 2 to 4, in the exemplary embodiment of the present disclosure, the frame 110 may be fixed to a floor of a process workplace. The frame 110 may be a single frame or may be a combination of two or more frames.

The frame 110 is adapted to support various constitutional elements described below. To this end, the frame 110 may include accessory elements such as a bracket, a block, a plate, a housing, a cover, and a collar.

However, since the accessory elements described above are for installing constitutional elements to the frame 110, in the exemplary embodiment of the present disclosure, the accessory elements described above are collectively referred to as the frame 110 except for exceptional cases.

Here, the frame 110 includes a lower frame 111, a plurality of supports 113, and an upper frame 115. The lower frame 111 is fixed to the floor of the process workplace. The plurality of supports 113 are fixed to an upper surface of the lower frame 111 along the vertical direction. The upper frame 115 is coupled to upper portions of the plurality of supports 113.

Referring to FIGS. 2 to 4, in the exemplary embodiment of the present disclosure, the shaft fixing unit 210 is adapted to fix the shaft 11 to a set position along the vertical direction. The shaft fixing unit 210 is installed to the lower frame 111.

Figure 5:
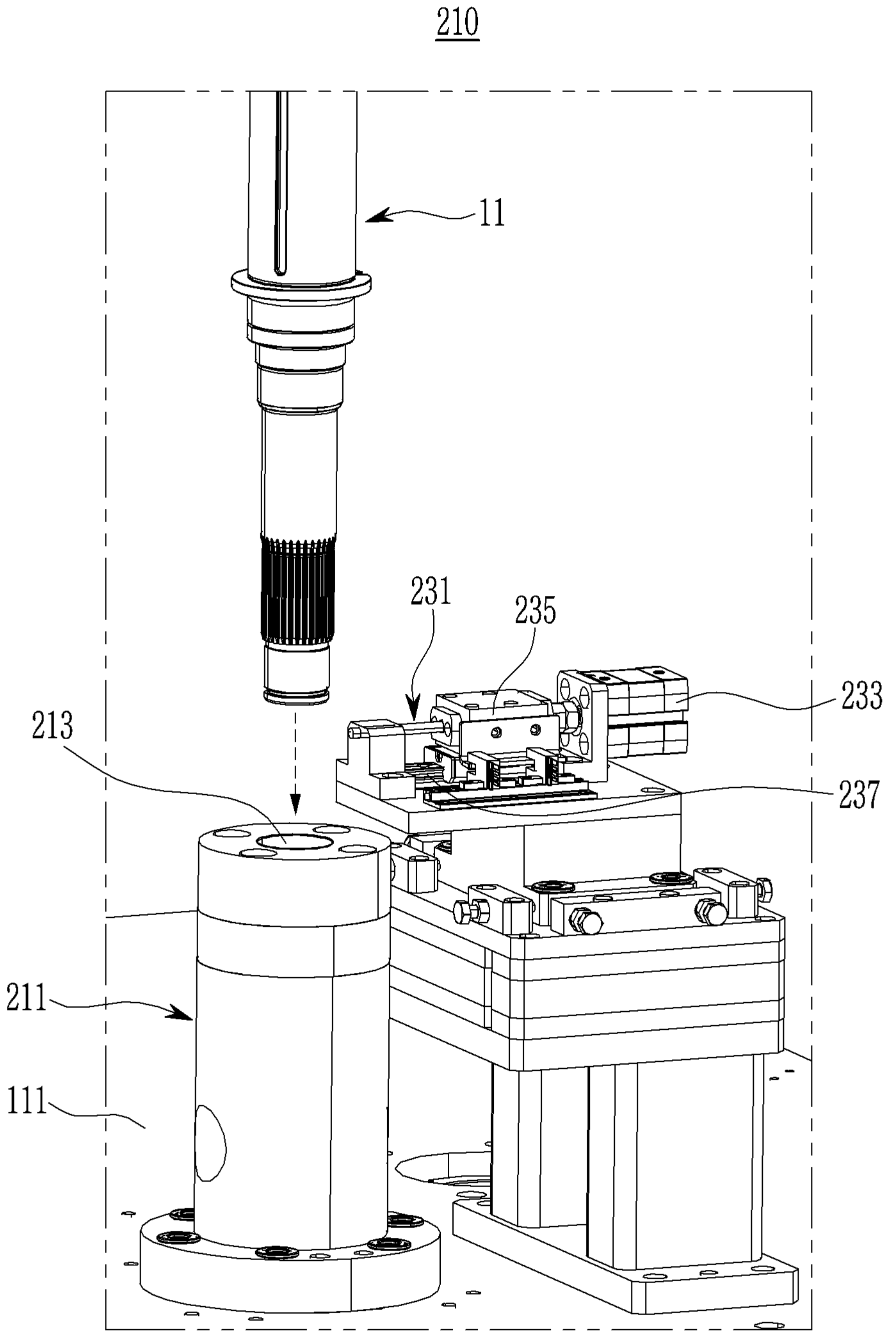
FIGS. 5, 6, and 7 are views showing a shaft fixing unit applied to the apparatus for assembling a rotor for a drive motor according to the exemplary embodiment of the present disclosure.
Figure 6:
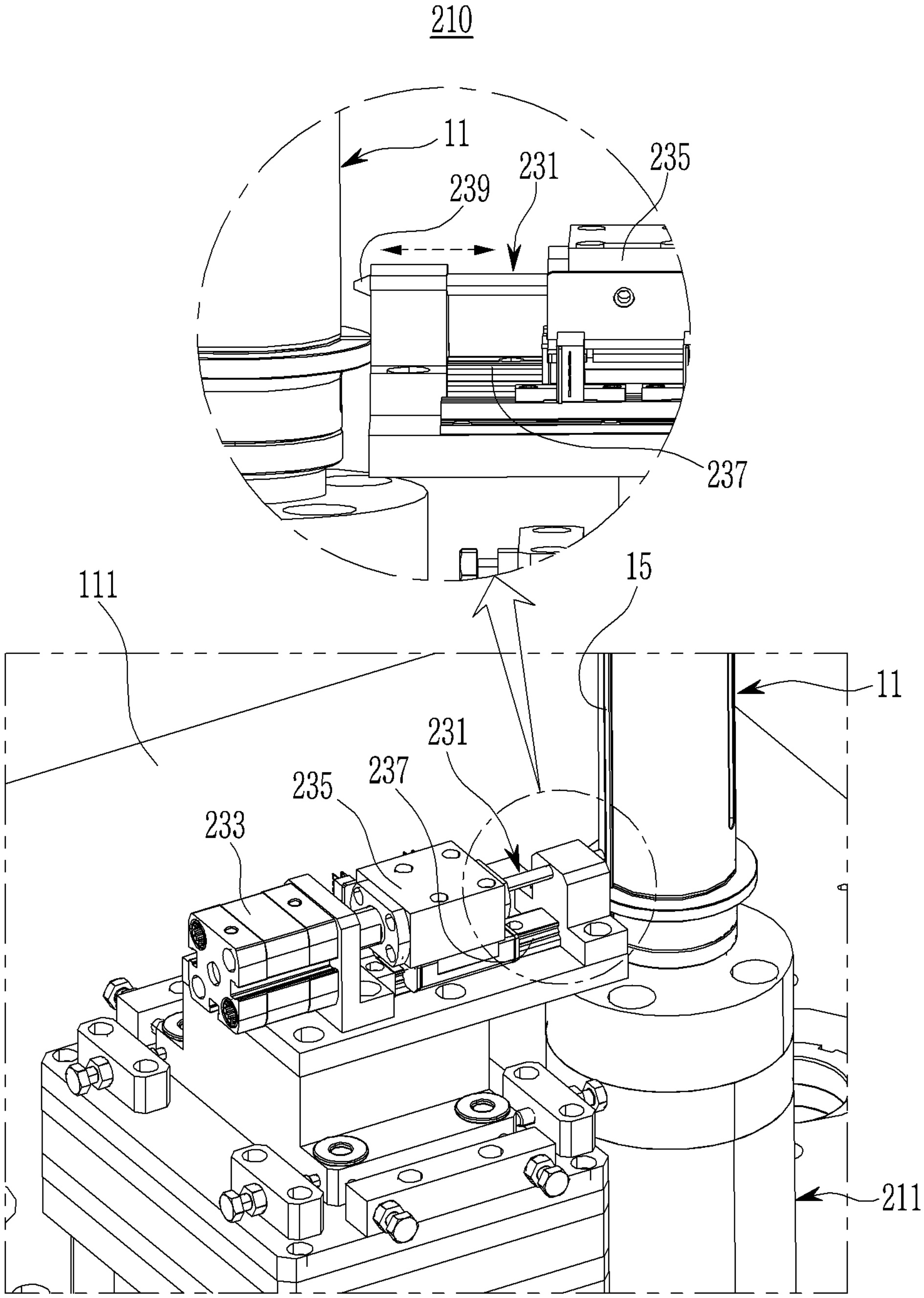
Figure 7:
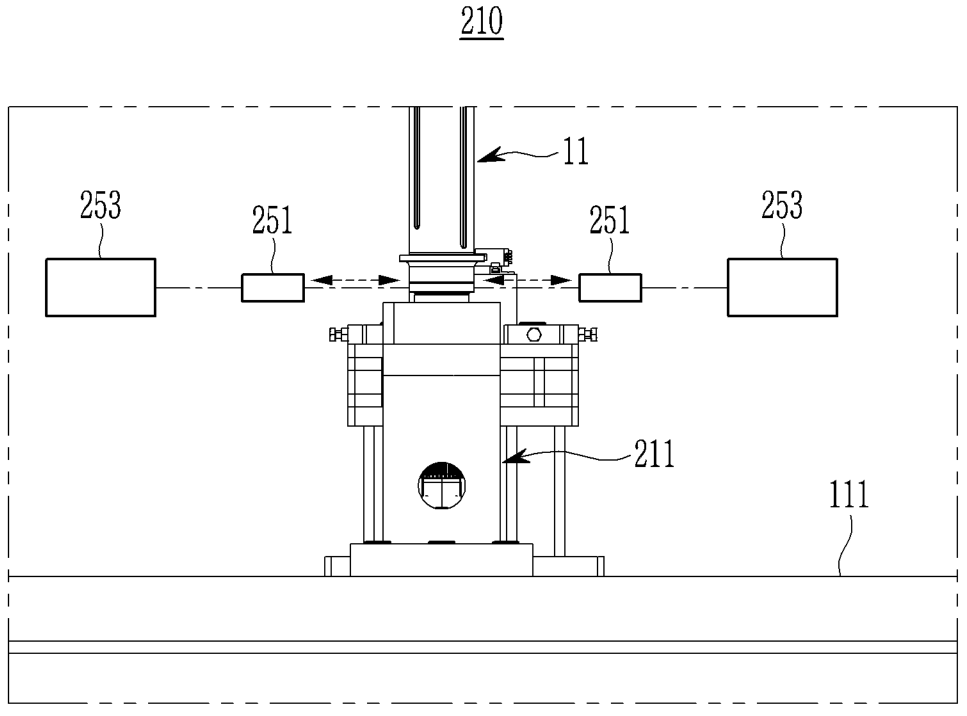

FIGS. 5 to 7 are views showing a shaft fixing unit applied to the apparatus for assembling a rotor for a drive motor according to the exemplary embodiment of the present disclosure.

First, referring to FIGS. 5 and 6, the shaft fixing unit 210 according to the exemplary embodiment of the present disclosure includes a shaft support member 211 and a shaft fixing pin 231.

The shaft support member 211 is adapted to support the shaft 11 along the vertical direction. The shaft support member 211 is coupled to the upper surface of the lower frame 111 and is arranged along the vertical direction.

In an example, the shaft support member 211 may have a cylindrical shape. The shaft support member 211 includes a shaft coupling hole 213 to which the shaft 11 is coupled. Accordingly, the shaft 11 may be inserted into the shaft coupling hole 213 along the vertical direction and fixed to the shaft support member 211.

The shaft fixing pin 231 is adapted to fix the shaft 11 to the shaft support member 211. The shaft fixing pin 231 may be installed to the lower frame 111 to be reciprocally movable in the left-right direction. The shaft fixing pin 231 may be pin-coupled to at least one pin groove 15 formed along the vertical direction on an outer circumferential surface of the shaft 11.

The shaft fixing pin 231 may be reciprocally moved along the left-right direction by an operation of a pin actuating cylinder 233 fixed to the lower frame 111. The shaft fixing pin 231 may be coupled to a connecting block 235 operably connected to the pin actuating cylinder 233. Here, the connecting block 235 may be coupled to a guide rail 237 to be slidably movable along the left-right (horizontal) direction.

Furthermore, the shaft fixing pin 231 includes a tapered portion 239 fitted into at least one pin groove 15. The tapered portion 239 is adapted to correct a minute play between the shaft fixing pin 231 and at least one pin groove 15.

Referring to FIG. 7, the shaft fixing unit 210 according to the exemplary embodiment of the present disclosure may further include a pair of clampers 251.

The pair of clampers 251 are adapted to additionally clamp the shaft 11 coupled to the shaft support member 211. Furthermore, when press-fitting the plurality of rotor core modules 30 (refer to FIGS. 1 to 4) to the shaft 11, the pair of clampers 251 are adapted to prevent the shaft 11 from slipping due to the press-fitting force.

The pair of clampers 251 are installed to the lower frame 111 to be reciprocally movable along the front-rear direction.

Each of the pair of clampers 251 may be reciprocally moved along the front-rear direction by a forward and rearward operation of clamp cylinders 253 substantially fixed to the lower frame 111 with the shaft support member 211 interposed therebetween. The pair of clampers 251 are adapted to be reciprocally moved toward or away from each other, and to clamp or unclamp the shaft 11. Here, the pair of clampers 251 may be operably connected to the clamp cylinders 253, respectively.

Referring to FIGS. 2 to 4, in the exemplary embodiment of the present disclosure, the elevation plate 310 is installed to the lower frame 111 to be reciprocally movable along the vertical direction.

Figure 8:
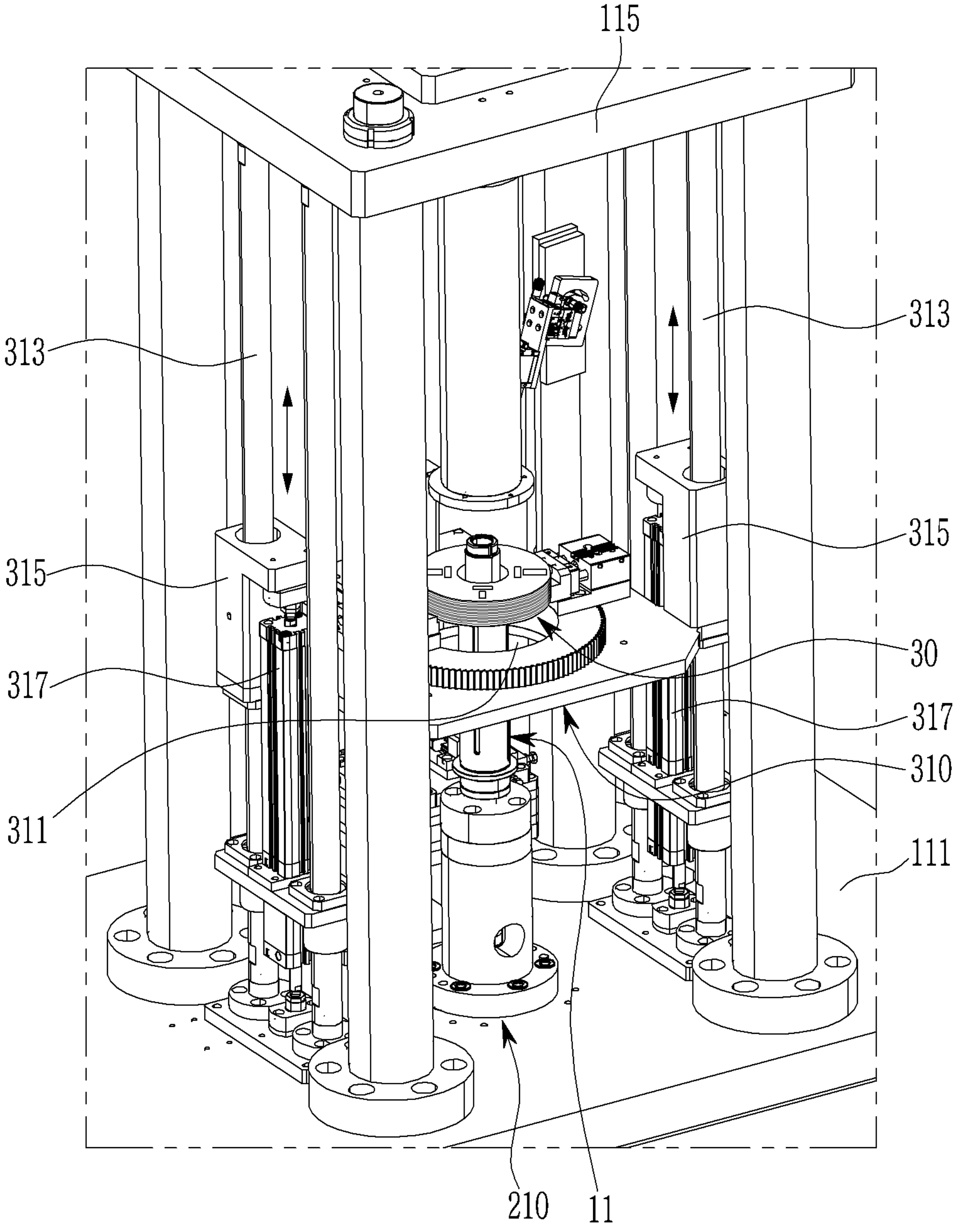
FIG. 8 is a view showing an elevation plate applied to the apparatus for assembling a rotor for a drive motor according to the exemplary embodiment of the present disclosure.

FIG. 8 is a view showing a region of the elevation plate applied to the apparatus for assembling a rotor for a drive motor according to the exemplary embodiment of the present disclosure.

Referring to FIG. 8, the elevation plate 310 includes a through-hole 311 formed so that the shaft 11 and the plurality of rotor core modules 30 pass therethrough along the vertical direction. The through-hole 311 is formed at a center of the elevation plate 310 at a position (e.g., upper side) corresponding to the shaft fixing unit 210.

Here, a plurality of guide rods 313 are installed between the lower frame 111 and the upper frame 115 along the vertical direction. The plurality of guide rods 313 may be arranged on the front and rear sides. Lower portions of the plurality of guide rods 313 may be coupled to the lower frame 111, and upper portions of the plurality of guide rods 313 may be coupled to the upper frame 115.

A pair of movable blocks 315 are coupled to the plurality of guide rods 313 to be slidably movable along the vertical direction. The pair of movable blocks 315 may be arranged on the front and rear sides.

Furthermore, the elevation plate 310 according to the exemplary embodiment of the present disclosure is coupled with the pair of movable blocks 315.

Furthermore, each of the pair of movable blocks 315 may be operably connected to an elevation cylinder 317 installed to the lower frame 111 along the vertical direction.

Accordingly, the pair of movable blocks 315 may be reciprocally moved in the vertical direction along the plurality of guide rods 313 by the forward and rearward operation of the elevation cylinder 317. Therefore, the elevation plate 310 can be reciprocally moved in the vertical direction together with the pair of movable blocks 315.

Referring to FIGS. 2 to 4, in the exemplary embodiment of the present disclosure, the core gripper 410 is adapted to grip and ungrip (release) at least one rotor core module 30 loaded to the upper portion of the shaft 11 among the plurality of rotor core modules 30. The core gripper 410 may be installed to the elevation plate 310 through the core rotating unit 610 described later.

Figure 9:
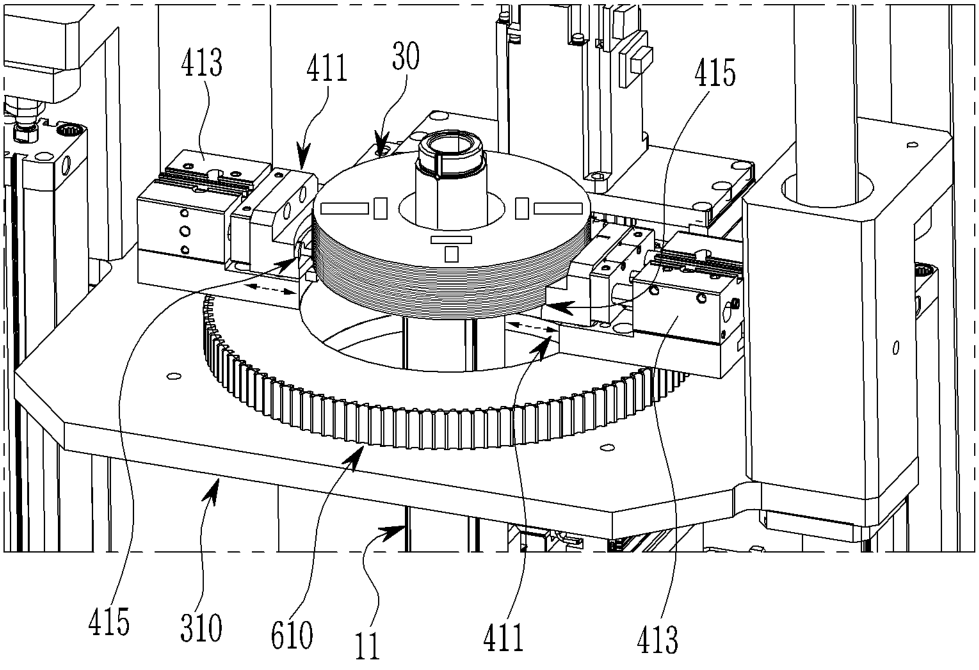
FIGS. 9 and 10 are views showing a core gripper applied to the apparatus for assembling a rotor for a drive motor according to the exemplary embodiment of the present disclosure.
Figure 10:
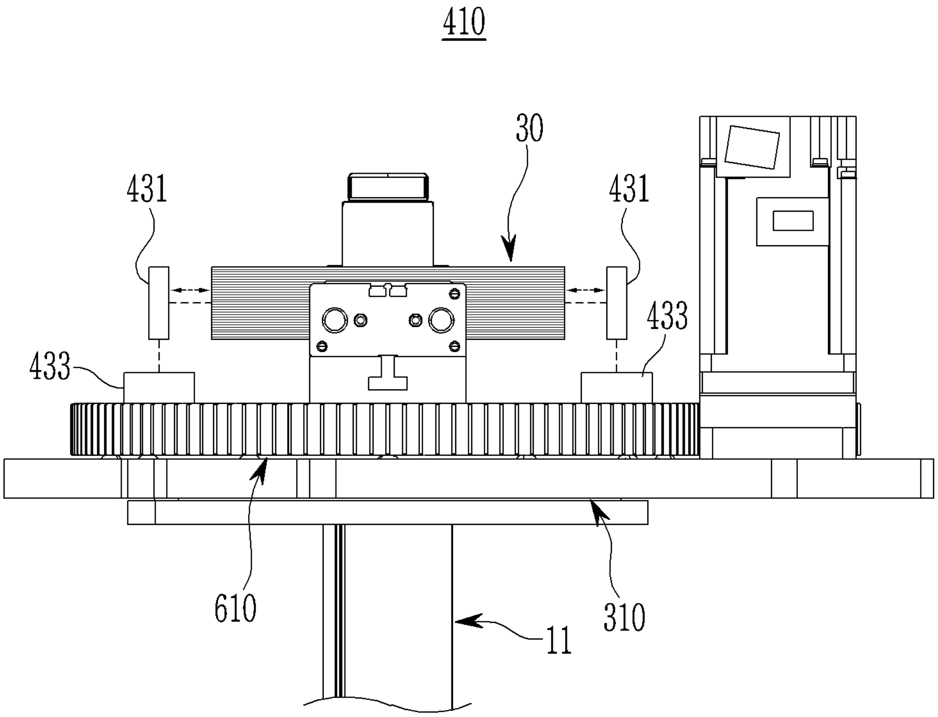

FIGS. 9 and 10 are views showing a core gripper applied to the apparatus for assembling a rotor for a drive motor according to the exemplary embodiment of the present disclosure.

First, referring to FIG. 9, the core gripper 410 according to the exemplary embodiment of the present disclosure includes a pair of lower grippers 411.

The pair of lower grippers 411 are adapted to grip or ungrip the lower portion of at least one rotor core module 30. The pair of lower grippers 411 are installed to the elevation plate 310 to be reciprocally movable. Furthermore, the pair of lower grippers 411 may be installed to the core rotating unit 610 described later to be reciprocally movable along the front-rear direction.

The pair of lower grippers 411 may be reciprocally moved along the front-rear direction by a forward and rearward operation of first gripper cylinders 413 installed to the core rotating unit 610 with at least one rotor core module 30 loaded to the shaft 11 being interposed therebetween, respectively. The pair of lower grippers 411 may be operably connected to the first gripper cylinders 413, respectively.

The pair of lower grippers 411 are adapted to reciprocally move toward or away from each other, and to grip or ungrip the lower portion of at least one rotor core module 30.

Here, each of the pair of lower grippers 411 may be provided in a block shape. Each of the pair of lower grippers 411 includes a plurality of core supports 415.

The plurality of core supports 415 are adapted to grip or ungrip at least one of the rotor core modules 30 having different outer diameters. The plurality of core supports 415 may be formed in a step shape along the vertical direction.

Referring to FIG. 10, the core gripper 410 according to the exemplary embodiment of the present disclosure may further include a pair of side grippers 431.

The pair of side grippers 431 are adapted to grip or ungrip an outer periphery of at least one rotor core module 30. The pair of side grippers 431 are installed to the elevation plate 310 to be reciprocally movable. Furthermore, the pair of side grippers 431 may be installed to the core rotating unit 610 described later to be reciprocally movable along the left-right direction.

The pair of side grippers 431 may be reciprocally moved along the left-right direction by a forward and rearward operation of second gripper cylinders 433 installed to the core rotating unit 610 with at least one rotor core module 30 loaded to the shaft 11 being interposed therebetween, respectively. The pair of side grippers 431 may be operably connected to the second gripper cylinders 433.

The pair of side grippers 431 are adapted to reciprocally move toward or away from each other, and to grip or ungrip the outer periphery of at least one rotor core module 30.

Referring to FIGS. 2 to 4, in the exemplary embodiment of the present disclosure, the main vision sensor 510 is adapted to vision-photograph at least one rotor core module 30 loaded to the upper portion of the shaft 11.

Figure 11:
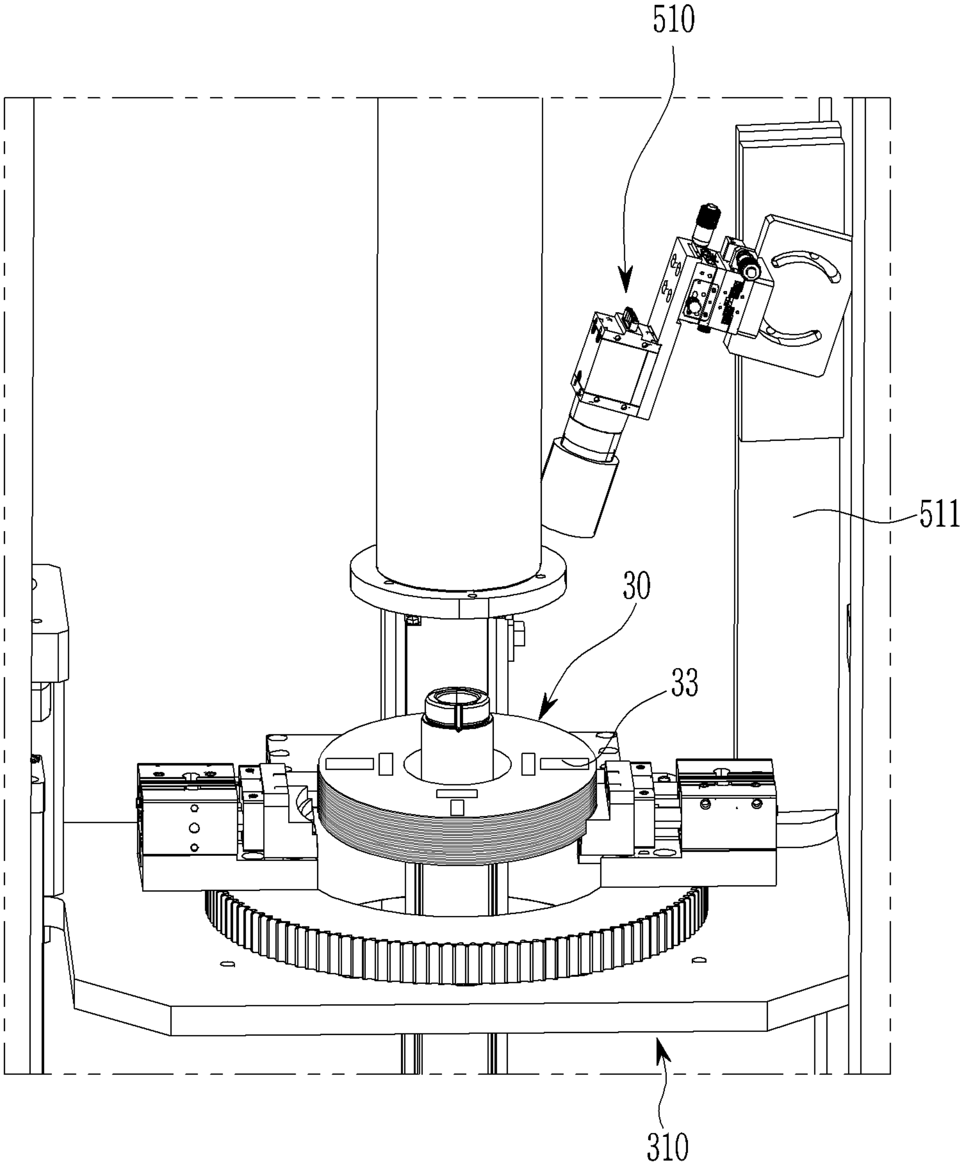
FIG. 11 is a view showing a main vision sensor applied to the apparatus for assembling a rotor for a drive motor according to the exemplary embodiment of the present disclosure.

As shown in FIG. 11, the main vision sensor 510 is installed to the elevation plate 310. The main vision sensor 510 may be fixed to a mounting bracket 511 installed to the elevation plate 310.

Here, the main vision sensor 510 may vision-photograph one or more magnet insertion holes 33 among a plurality of magnet insertion holes 33 formed at positions set for at least one rotor core module 30. The main vision sensor 510 may extract vision data of at least one rotor core module 30 and output the vision data to the controller 810 (refer to FIG. 4) described later.

Figure 12:
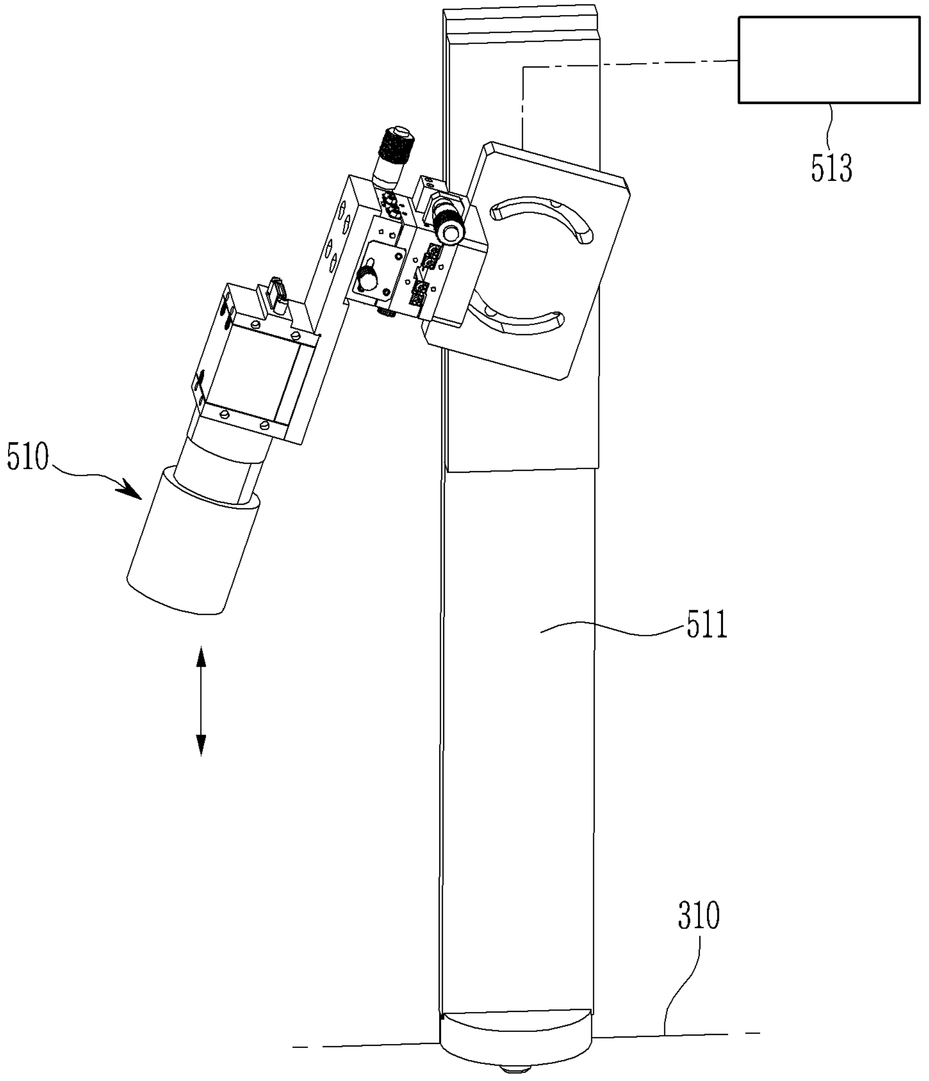
FIG. 12 is a view schematically showing a modified example of the main vision sensor applied to the apparatus for assembling a rotor for a drive motor according to the exemplary embodiment of the present disclosure.

Alternatively, as shown in FIG. 12, the main vision sensor 510 according to the exemplary embodiment of the present disclosure may be installed to the mounting bracket 511 coupled to the elevation plate 310 to be movable along the vertical direction.

The main vision sensor 510 is adapted to vision-photograph at least one rotor core module 30 (refer to FIG. 11) loaded to the upper portion of the shaft 11 (refer to FIG. 11) and at least one rotor core module 30 press-fitted to the shaft 11.

Here, the main vision sensor 510 may be reciprocally moved along the vertical direction by a forward and rearward operation of a sensor cylinder 513 fixed to the mounting bracket 511. The main vision sensor 510 may be operably connected to the sensor cylinder 513.

Referring to FIGS. 2 to 4, in the exemplary embodiment of the present disclosure, the core rotating unit 610 is adapted to rotate at least one rotor core module 30 at the set skew angle according to the vision data from the main vision sensor 510.

The core rotating unit 610 is installed to the elevation plate 310 and may be connected to the core gripper 410.

Figure 13:
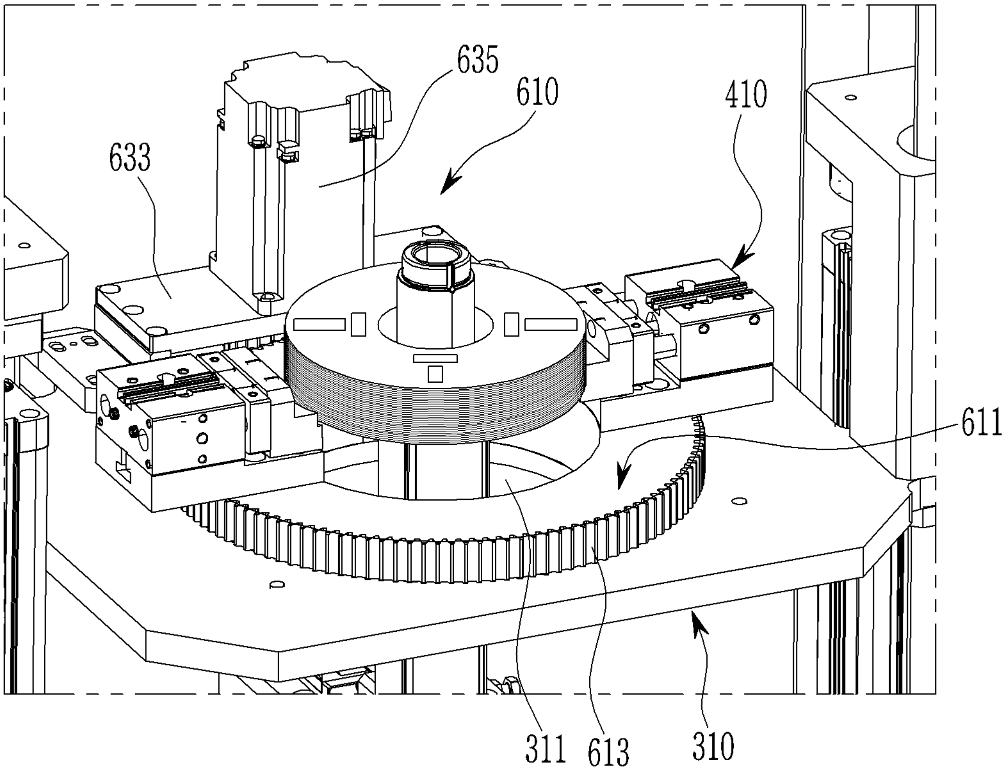
FIGS. 13 and 14 are views showing a core rotating unit applied to the apparatus for assembling a rotor for a drive motor according to the exemplary embodiment of the present disclosure.
Figure 14:
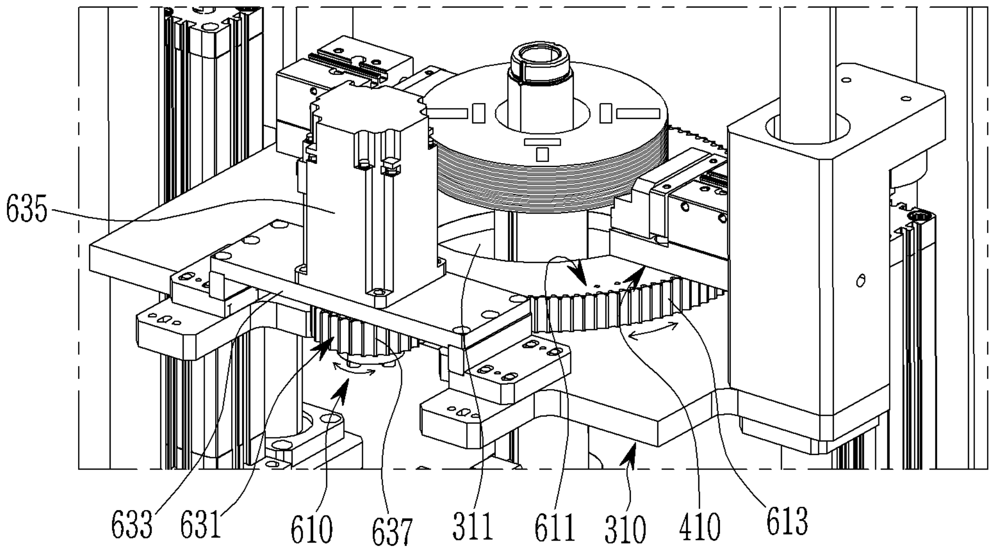

FIGS. 13 and 14 are views showing a core rotating unit applied to the apparatus for assembling a rotor for a drive motor according to the exemplary embodiment of the present disclosure.

Referring to FIGS. 13 and 14, the core rotating unit 610 according to the exemplary embodiment of the present disclosure includes a turning gear 611 and a drive gear 631.

The turning gear 611 has a ring shape, and one skilled in the art commonly refer to the turning gear 611 as a turn table gear. Furthermore, the turning gear 611 may be provided in the form of an external gear.

The turning gear 611 may be rotatably coupled to an edge portion of the through-hole 311 of the elevation plate 310 via a bearing (not shown).

Here, the turning gear 611 may be connected (e.g., coupled) to the core gripper 410 described above. An outer circumferential surface of the turning gear 611 is formed with a plurality of driven gear teeth 613.

The drive gear 631 is adapted to apply rotational force to the turning gear 611. The drive gear 631 is rotatably installed to the elevation plate 310 at a position corresponding to the turning gear 611.

The drive gear 631 may be rotated by driving of a servo motor 635 fixed to the elevation plate 310 through a fixing bracket 633. The drive gear 631 may be operably connected to the servo motor 635. Here, the servo motor 635 is capable of servo control of rotational speed and rotational direction (e.g., forward and reverse directions).

An outer circumferential surface of the drive gear 631 is formed with a plurality of drive gear teeth 637. The plurality of drive gear teeth 637 may be in mesh (i.e., interlock) with the plurality of driven gear teeth 613 of the turning gear 611.

Referring to FIGS. 2 to 4, in the exemplary embodiment of the present disclosure, the core press-fitting unit 710 is adapted to press-fit at least one rotor core module 30 loaded to the upper portion of the shaft 11 to the shaft 11 along the axial direction. The core press-fitting unit 710 is installed to the upper frame 115.

Figure 15:
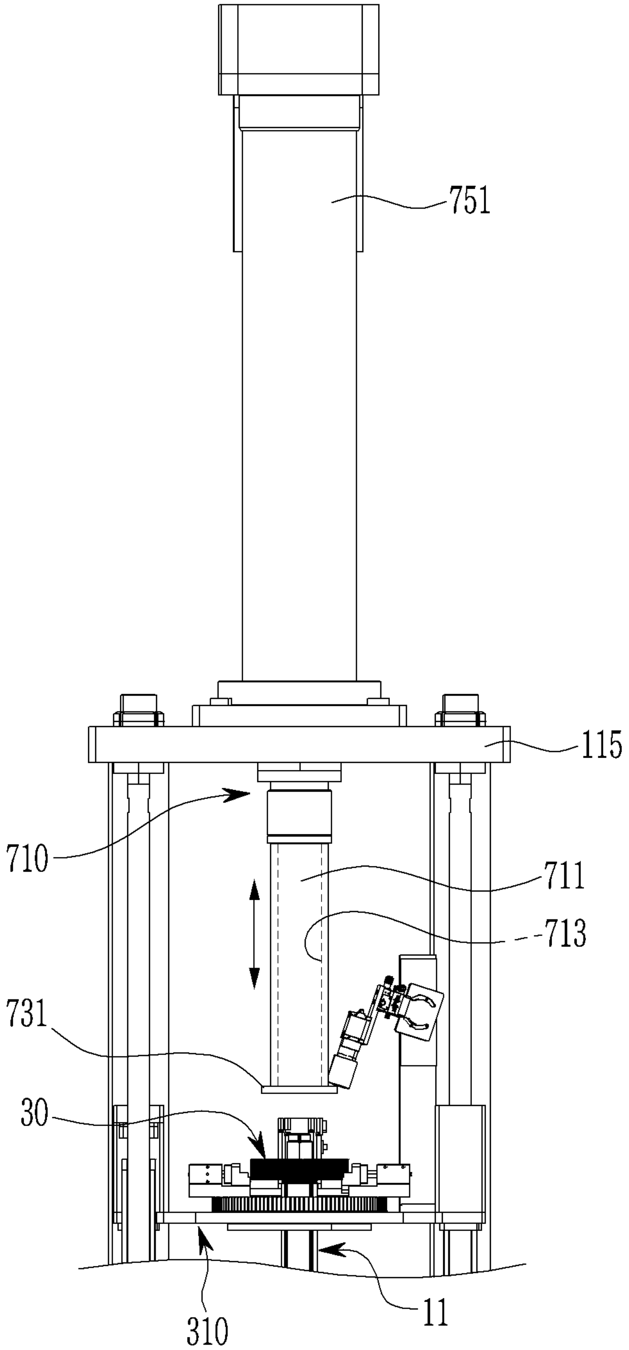
FIG. 15 is a view showing a core press-fitting unit applied to the apparatus for assembling a rotor for a drive motor according to the exemplary embodiment of the present disclosure.

FIG. 15 is a view showing a core press-fitting unit applied to the apparatus for assembling a rotor for a drive motor according to the exemplary embodiment of the present disclosure.

Referring to FIG. 15, the core press-fitting unit 710 according to the exemplary embodiment of the present disclosure may include a press-fitting rod 711, a press-fitting head 731, and a press-fitting press 751.

The press-fitting rod 711 is installed to the upper frame 115 at a position corresponding to the axial direction of the shaft 11 to be movable in the vertical direction. The press-fitting rod 711 forms a hollow 713 along the vertical direction. The shaft 11 may be fitted into the hollow 713.

The press-fitting head 731 is adapted to substantially press-fit at least one rotor core module 30 to the shaft 11. The press-fitting head 731 has a ring shape and may be coupled to a lower portion of the press-fitting rod 711.

The press-fitting press 751 is installed to the upper frame 115 and may be operably connected to the press-fitting rod 711. The press-fitting press 751 may apply a forward and rearward operating force along the vertical direction to the press-fitting rod 711 by a drive device known to one skilled in the art, such as a servo motor, a linear motor and an actuating cylinder.

Here, the press-fitting rod 711 as described above is synchronized with the elevation plate 310 by driving of the press-fitting press 751 and can be moved downward.

Referring to FIG. 4, in the exemplary embodiment of the present disclosure, the controller 810 is adapted to control an overall operation of the apparatus 100 for assembling a rotor for a drive motor.

The controller 810 is adapted to apply a control signal to the core rotating unit 610 by using the vision data received from the main vision sensor 510. For this purpose, the controller 810 may be implemented by one or more processors that operate according to a set program. In particular, the controller 810 may be implemented by one or more processors that implements a vision recognition function known to one skilled in the art.

In an example, the controller 810 may obtain vision data from the main vision sensor 510, analyze the vision data, and apply a position control signal to the servo motor 635 (refer to FIG. 14) of the core rotating unit 610.

Hereinafter, a rotor assembling method using the apparatus 100 for assembling a rotor for a drive motor according to the exemplary embodiment of the present disclosure configured as described above will be described in detail with reference to FIGS. 1 to 15.

First, in the exemplary embodiment of the present disclosure, the shaft fixing pin 231 of the shaft fixing unit 210 is moved rearward by the rearward operation of the pin actuating cylinder 233.

Furthermore, in the exemplary embodiment of the present disclosure, the pair of clampers 251 of the shaft fixing unit 210 are moved rearward by the rearward operation of the clamp cylinders 253.

In the exemplary embodiment of the present disclosure, the elevation plate 310 is moved upward along the plurality of guide rods 313 through the pair of movable blocks 315 by the forward operation of the elevation cylinder 317.

Here, since the core gripper 410, the main vision sensor 510 and the core rotating unit 610 are configured on the elevation plate 310, they are moved upward together with the elevation plate 310.

In addition, in the exemplary embodiment of the present disclosure, the pair of lower grippers 411 of the core gripper 410 are moved rearward by the rearward operation of the first gripper cylinders 413.

Furthermore, in the exemplary embodiment of the present disclosure, the pair of side grippers 431 of the core gripper 410 are moved rearward by the rearward operation of the second gripper cylinders 433.

In the exemplary embodiment of the present disclosure, the press-fitting rod 711 and the press-fitting head 731 of the core press-fitting unit 710 are moved upward by the driving of the press-fitting press 751.

In this state, the shaft 11 is coupled to the shaft support member 211 of the shaft fixing unit 210. Here, the shaft 11 may be fitted into the shaft coupling hole 213 of the shaft support member 211 along the vertical direction and fixed to the shaft support member 211. In this case, the shaft 11 may be coupled to the shaft support member 211 by a manual operation of an operator, or may be coupled to the shaft support member 211 by a handling robot known to one skilled in the art.

Then, the shaft fixing pin 231 is moved forward by the forward operation of the pin actuating cylinder 233, and is pin-coupled to at least one pin groove 15 of the shaft 11. In this case, the shaft fixing pin 231 may be coupled to at least one pin groove 15 through the tapered portion 239. Therefore, the tapered portion 239 may correct a minute play between the shaft fixing pin 231 and at least one pin groove 15 and fix the shaft 11 to the shaft support member 211.

During this process, the pair of clampers 251 move forward toward each other by the forward operation of the clamp cylinder 253, and additionally clamp the shaft 11.

Next, at least one rotor core module 30 is loaded to the upper portion of the shaft 11 through the shaft insertion hole 31. In this case, at least one rotor core module 30 may be loaded to the upper portion of the shaft 11 by a manual operation of an operator, or may be loaded to the upper portion of the shaft 11 by a handling robot known to one skilled in the art.

In the state in which the shaft 11 is fixed by the shaft fixing unit 210 as described above, the pair of lower grippers 411 move forward by the forward operation of the first gripper cylinders 413, and grip the lower portion of at least one rotor core module 30.

Here, each of the pair of lower grippers 411 may grip the lower portion of at least one rotor core module 30 through the plurality of core supports 415. In this case, since the plurality of core supports 415 are formed in a step shape along the vertical direction, at least one of the rotor core modules 30 having different outer diameters can be gripped.

During this process, the pair of side grippers 431 move forward by the forward operation of the second gripper cylinders 433 and grip the outer periphery of at least one rotor core module 30.

During the above process, the main vision sensor 510 vision-photographs at least one rotor core module 30 and outputs vision data to the controller 810.

Then, the controller 810 compares the vision data obtained from the main vision sensor 510 with preset reference data to calculate a position value of at least one rotor core module 30.

In addition, the controller 810 applies a position control signal in which the position value of at least one rotor core module 30 is reflected to the servo motor 635 of the core rotating unit 610.

Accordingly, the servo motor 635 is driven by the position control signal. Then, the drive gear 631 is rotated by the driving of the servo motor 635, and the turning gear 611 interlocked with the drive gear 631 rotates with a set amount of rotation according to the position control signal.

Here, the turning gear 611 rotates together with the pair of lower grippers 411 and the pair of side grippers 431 gripping at least one rotor core module 30.

Furthermore, in order to prevent backlash between the turning gear 611 and the drive gear 631, the drive gear 631 may be rotated by a rotation angle set in an opposite direction to the set rotation direction, and then rotated in the set rotation direction. Such an operation of the core rotating unit 610 may be implemented by a gear backlash algorithm known to one skilled in the art.

Thus, at least one rotor core module 30 is rotated at a set skew angle at the upper portion of the shaft 11 by the operation of the core rotating unit 610 as described above.

Next, the press-fitting rod 711 and the press-fitting head 731 of the core press-fitting unit 710 are moved downward by the driving of the press-fitting press 751. Then, the upper portion of the shaft 11 is fitted into the hollow 713 of the press-fitting rod 711, and the press-fitting head 731 presses at least one rotor core module 30.

During this process, the elevation plate 310 moves downward along the plurality of guide rods 313 through the pair of movable blocks 315 by the rearward operation of the elevation cylinder 317.

Here, the elevation plate 310 is synchronized with the press-fitting rod 711 and the press-fitting head 731 and is moved downward together with the core gripper 410, the main vision sensor 510 and the core rotating unit 610.

Furthermore, during the above process, the pair of lower grippers 411 move rearward by the rearward operation of the first gripper cylinders 413 and ungrip (release) the lower portion of at least one rotor core module 30.

In this state, at least one rotor core module 30 is primarily press-fitted to the shaft 11 by the press-fitting rod 711 and the press-fitting head 731 moving downward.

Then, the pair of side grippers 431 move rearward by the rearward operation of the second gripper cylinders 433, and ungrip the outer periphery of at least one rotor core module 30.

In the state described above, at least one rotor core module 30 is finally press-fitted to the shaft 11 by the press-fitting rod 711 and the press-fitting head 731 moving downward.

Here, while moving downward by the operation of the sensor cylinder 513, the main vision sensor 510 as described above may vision-photograph at least one rotor core module 30 press-fitted to the shaft 11 and output the vision data to the controller 810. Then, the controller 810 may determine whether at least one rotor core module 30 is located at a predetermined position, based on the vision data obtained from the main vision sensor 510.

Therefore, the apparatus 100 for assembling a rotor for a drive motor according to the exemplary embodiment of the present disclosure can press-fit the plurality of rotor core modules 30 to the shaft 11 while repeating a series of operation processes as described above.

The apparatus 100 for assembling a rotor for a drive motor according to the exemplary embodiment of the present disclosure can automatically assign the set skew angles to the plurality of rotor core modules 30, and press-fit the plurality of rotor core modules 30 to the shaft 11.

Thus, the apparatus 100 for assembling a rotor for a drive motor according to the exemplary embodiment of the present disclosure can assemble the rotor core 21 from which the key structure is omitted to the shaft 11, and minimize skew angle tolerances of the plurality of rotor core modules 30.

Furthermore, since the apparatus 100 for assembling a rotor for a drive motor according to the exemplary embodiment of the present disclosure assembles the rotor core 21 from which the key structure is omitted to the shaft 11, it is possible to reduce the number of manufacturing processes of the rotor core 21 and the facility investment cost.

Furthermore, the apparatus 100 for assembling a rotor for a drive motor according to the exemplary embodiment of the present disclosure can simplify the design and assembly of the rotor core 21, and share the rotor core 21 for each type of drive motor.

Figure 16:
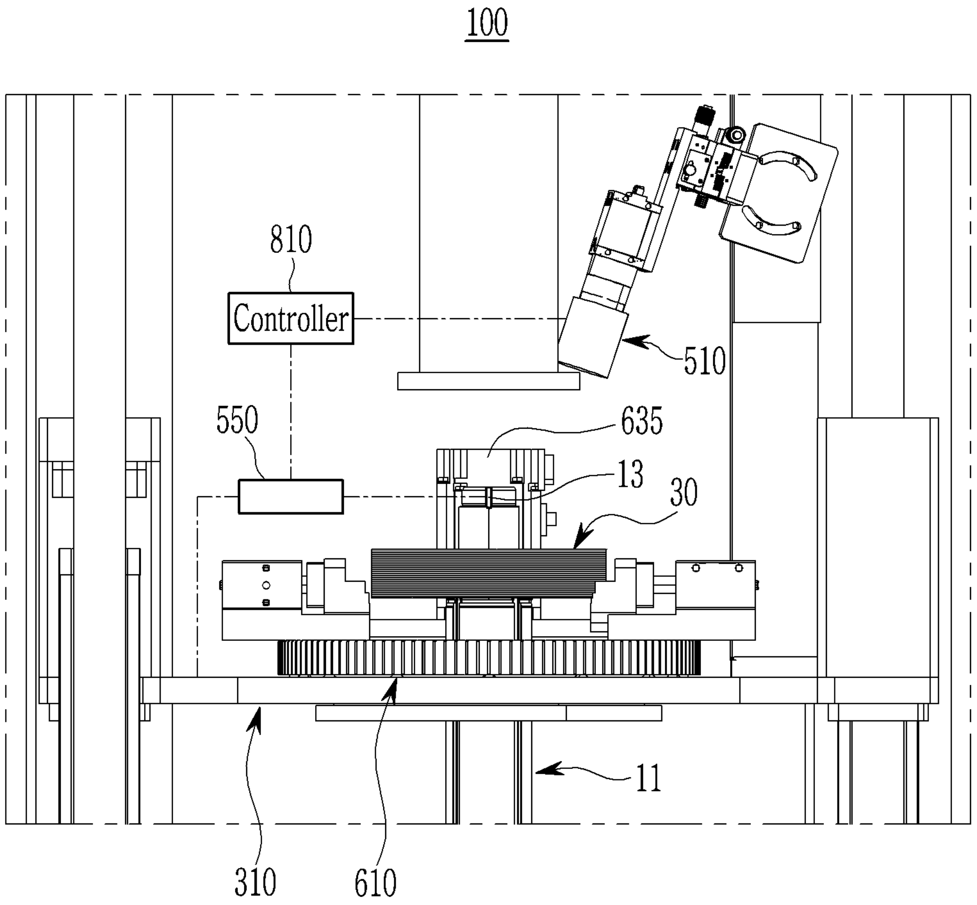
FIG. 16 is a view schematically showing a sub-vision sensor applied to the apparatus for assembling a rotor for a drive motor according to the exemplary embodiment of the present disclosure.

FIG. 16 is a view schematically showing a sub-vision sensor applied to the apparatus for assembling a rotor for a drive motor according to the exemplary embodiment of the present disclosure.

Referring to FIG. 16, the apparatus 100 for assembling a rotor for a drive motor according to the exemplary embodiment of the present disclosure may further include a sub-vision sensor 550.

In the exemplary embodiment of the present disclosure, the sub-vision sensor 550 may be installed to the elevation plate 310. The sub-vision sensor 550 vision-photographs the resolver groove 13 formed on the upper portion of the shaft 11 and outputs vision data to the controller 810.

Therefore, the controller 810 compares the vision data obtained from the sub-vision sensor 550 with preset reference data to calculate a position value of the shaft 11.

Thus, the controller 810 applies a position control signal, in which the position value of at least one rotor core module 30 calculated based on the vision data obtained from the main vision sensor 510 and the position value of the shaft 11 described above are reflected, to the servo motor 635 of the core rotating unit 610.

Then, at least one rotor core module 30 may be rotated at the set skew angle by the operation of the core rotating unit 610.

Figure 17:
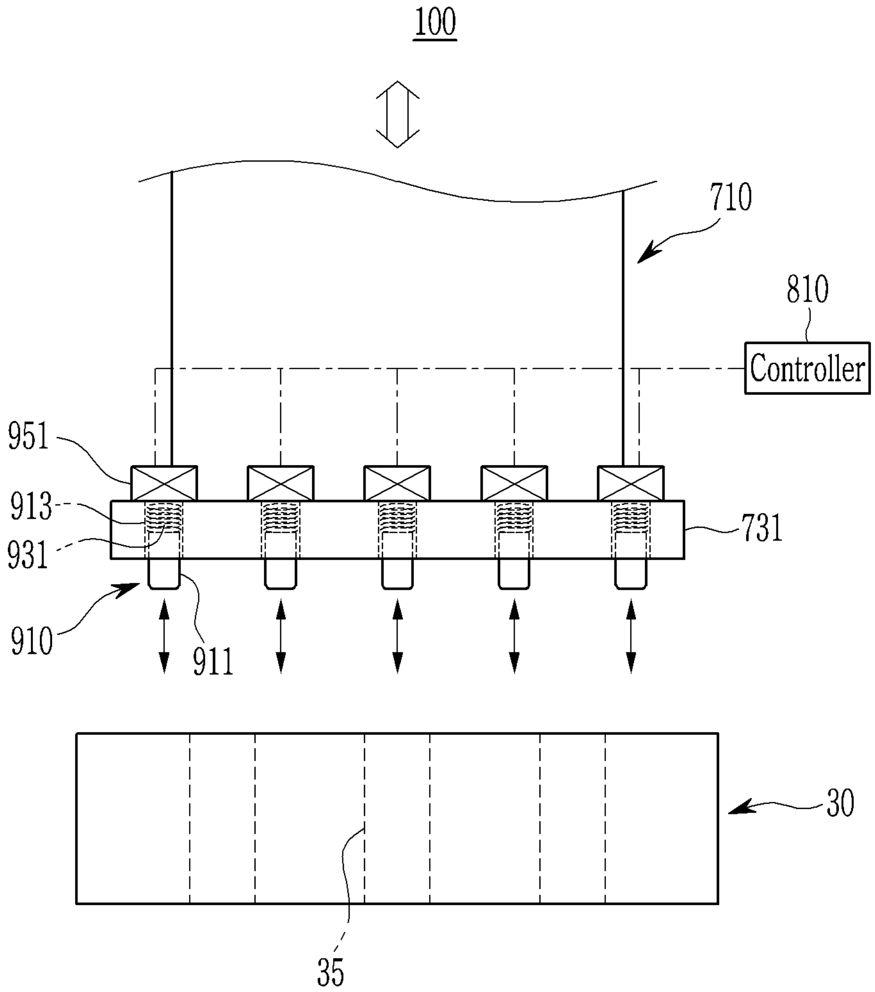
FIG. 17 is a view schematically showing a sensor unit applied to the apparatus for assembling a rotor for a drive motor according to the exemplary embodiment of the present disclosure.

FIG. 17 is a view schematically showing a sensor unit applied to the apparatus for assembling a rotor for a drive motor according to the exemplary embodiment of the present disclosure.

Referring to FIG. 17, the apparatus 100 for assembling a rotor for a drive motor according to the exemplary embodiment of the present disclosure may further include a sensor unit 910 installed to the core press-fitting unit 710.

In the exemplary embodiment of the present disclosure, the sensor unit 910 is adapted to sense a position of at least one rotor core module 30. The sensor unit 910 may be installed to the press-fitting head 731 of the core press-fitting unit 710.

The sensor unit 910 includes a plurality of pin members 911, a plurality of springs 931, and a plurality of displacement sensors 951.

The plurality of pin members 911 are installed in a plurality of mounting holes 913 spaced apart from each other along a circumferential direction of the press-fitting head 731 to be movable in the vertical direction. The plurality of pin members 911 may be inserted into the plurality of tooling holes 35 formed in at least one rotor core module 30.

The plurality of springs 931 are adapted to exert elastic force on the plurality of pin members 911 through the press-fitting head 731. Each of the plurality of springs 931 is arranged in each of the plurality of mounting holes 913 and is mounted to each of the plurality of pin members 911. In an example, each of the plurality of springs 931 may be provided as a coil spring.

Here, upper portions of the plurality of springs 931 may be coupled to inner circumferential surfaces of the plurality of mounting holes 913, and lower portions of the plurality of springs 931 may be coupled to the plurality of pin members 911.

The plurality of displacement sensors 951 may sense displacements (e.g., vertical movements) of the plurality of corresponding pin members 911 and output sensing signals to the controller 810.

The plurality of displacement sensors 951 are installed to the press-fitting head 731 at positions corresponding to the plurality of pin members 911. Since the plurality of displacement sensors 951 are known to one skilled in the art, further detailed descriptions thereof will be omitted.

Therefore, when press-fitting at least one rotor core module 30 by the press-fitting head 731, at least one pin member 911 of the plurality of pin members 911 may be inserted into at least one tooling hole 35 of the plurality of tooling holes 35.

The plurality of remaining pin members 911 except at least one pin member 911 are not inserted into the plurality of tooling holes 35, compress the plurality of springs 931, and can move upward through the plurality of mounting holes 913.

During this process, the plurality of displacement sensors 951 sense displacements of the plurality of pin members 911 and output sensing signals to the controller 810.

Then, the controller 810 analyzes the sensing signals obtained from the plurality of displacement sensors 951 and extracts position values of the plurality of tooling holes 35.

In addition, the controller 810 may compare the position values of the plurality of tooling holes 35 with a preset reference value to determine whether at least one rotor core module 30 is located at a predetermined position, and transmit a determination result to the server (not shown) and a display (not shown).

Figure 18:
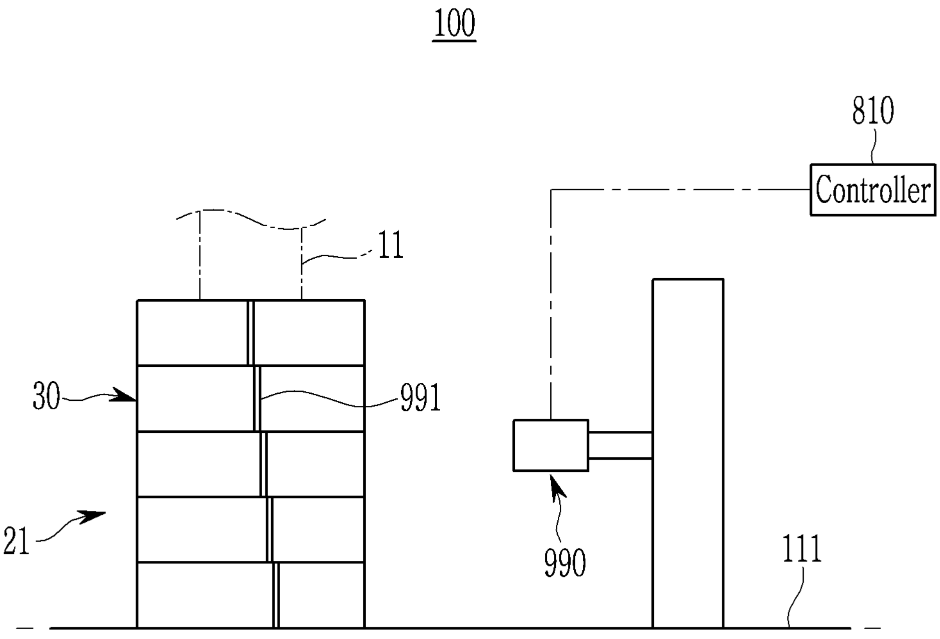
FIG. 18 is a view schematically showing an inspection vision sensor applied to the apparatus for assembling a rotor for a drive motor according to the exemplary embodiment of the present disclosure.

FIG. 18 is a view schematically showing an inspection vision sensor applied to the apparatus for assembling a rotor for a drive motor according to the exemplary embodiment of the present disclosure.

Referring to FIG. 18, the apparatus 100 for assembling a rotor for a drive motor according to the exemplary embodiment of the present disclosure may further include an inspection vision sensor 990 installed to the lower frame 111.

In the exemplary embodiment of the present disclosure, the inspection vision sensor 990 may vision-photograph the outer circumferential surfaces of the plurality of rotor core modules 30 press-fitted to the shaft 11 and output vision data to the controller 810.

Here, the inspection vision sensor 990 may vision-photograph a notch groove 991 formed on an outer circumferential surface of each of the plurality of rotor core modules 30, and output vision data to the controller 810.

Therefore, the controller 810 analyzes the vision data obtained from the inspection vision sensor 990 and extracts a position value of the notch groove 991 of each of the plurality of rotor core modules 30.

In addition, the controller 810 may determine whether the assembly of the rotor core 21 is good by comparing the position values of the notch grooves 991 with preset reference values, and transmit a determination result (e.g., OK or NG) to a server (not shown) and a display (not shown).

While this disclosure has been described in connection with what is presently considered to be practical exemplary embodiments, it is to be understood that the disclosure is not limited to the disclosed exemplary embodiments. On the contrary, it is intended to cover various modifications and equivalent arrangements included within the spirit and scope of the appended claims.

The invention claimed is:

1. An apparatus for assembling a rotor for a drive motor configured to press-fit, to a shaft, a plurality of rotor core modules, each of the plurality of rotor core modules having a plurality of stacked electrical steel sheets, the apparatus comprising:

a frame;

a shaft fixing unit secured to the frame to fix the shaft along a vertical direction of the frame;

an elevation plate having a through-hole configured to allow the shaft and the plurality of rotor core modules to pass therethrough along the vertical direction, and secured to the frame to be movable in the vertical direction;

a core gripper secured to the elevation plate, the core gripper configured to grip and release at least one rotor core module loaded to an upper portion of the shaft;

a main vision sensor secured to the elevation plate, the main vision sensor configured to vision-photograph the at least one rotor core module;

a core rotating unit connected to the core gripper and secured to the elevation plate, the core rotating unit configured to rotate the at least one rotor core module at a set skew angle according to vision data from the main vision sensor; and a core press-fitting unit secured to the frame, the core press-fitting unit configured to press-fit the at least one rotor core module to the shaft along an axial direction.

2. The apparatus of claim 1, further comprising a controller configured to analyze the vision data acquired from the main vision sensor, and to apply a control signal to the core rotating unit.

3. The apparatus of claim 1, wherein the shaft fixing unit comprises:

a shaft support member secured to the frame at a position corresponding to the through-hole of the elevation plate; and a shaft fixing pin secured to the frame and configured to be reciprocally movable and to couple to a pin groove formed on an outer circumferential surface of the shaft.

4. The apparatus of claim 3, wherein the shaft fixing pin comprises:

a tapered portion configured to be fitted into the pin groove.

5. The apparatus of claim 3, wherein the shaft fixing unit further comprises:

a pair of clampers secured to the frame configured to be reciprocally movable so as to clamp the shaft coupled to the shaft support member.

6. The apparatus of claim 1, further comprising a sub-vision sensor secured to the elevation plate, and configured to vision-photograph a resolver groove formed on the upper portion of the shaft and to output vision data to the controller.

7. The apparatus of claim 1, wherein:

a plurality of guide rods are secured to the frame along the vertical direction;

a pair of movable blocks are coupled to the plurality of guide rods, and are configured to be movable in the vertical direction; and the elevation plate is coupled to the pair of movable blocks.

8. The apparatus of claim 7, wherein each of the pair of movable blocks is connected to an elevation cylinder secured to the frame along the vertical direction.

9. The apparatus of claim 1, wherein the core gripper comprises:

a pair of lower grippers secured to the core rotating unit, the pair of lower grippers configured to be reciprocally movable so as to grip a lower portion of the at least one rotor core module; and a pair of side grippers secured to the core rotating unit, the pair of side grippers configured to be reciprocally movable so as to grip an outer periphery of the at least one rotor core module.

10. The apparatus of claim 9, wherein each of the pair of lower grippers comprises a plurality of core supports formed in a step shape along the vertical direction.

11. The apparatus of claim 1, wherein the main vision sensor is fixed to a mounting bracket secured to the elevation plate, and the main visor sensor is secured to a mounting bracket coupled to the elevation plate and configured to be movable along the vertical direction.

12. The apparatus of claim 1, wherein the core rotation unit comprises:

a ring-shaped turning gear rotatably coupled to an edge portion of the through-hole of the elevation plate, and connected to the core gripper; and a drive gear secured to the elevation plate to be rotatable by driving of a servo motor, and configured to interlock with the turning gear.

13. The apparatus of claim 1, wherein the core press-fitting unit comprises:

a hollow-shaped press-fitting rod secured to the frame and configured to be movable in the vertical direction at a position corresponding to the axial direction of the shaft;

a press-fitting head coupled to a lower portion of the press-fitting rod configured to press-fit the at least one rotor core module to the shaft; and a press-fitting press secured to the frame and connected to the press-fitting rod.

14. The apparatus of claim 13, wherein the press-fitting rod is configured to be synchronized with the elevation plate by driving of the press-fitting press, and to be movable downward.

15. The apparatus of claim 1, further comprising an inspection vision sensor configured to vision-photograph outer circumferential surfaces of the plurality of rotor core modules press-fitted to the shaft, and to output vision data to a controller.

16. The apparatus of claim 1, further comprising a sensor unit secured to the core press-fitting unit configured to sense a position of the at least one rotor core module.

17. The apparatus of claim 16, wherein the core press-fitting unit comprises a press-fitting head installed to the frame and configured to be movable in the vertical direction, and wherein the sensor unit is secured to the press-fitting head.

18. The apparatus of claim 17, wherein the sensor unit comprises:

a plurality of pin members secured to the press-fitting head and configured to be movable in the vertical direction;

a plurality of springs each mounted to each of the plurality of pin members, the plurality of springs configured to exert elastic force on the plurality of pin members through the press-fitting head; and a plurality of displacement sensors secured to the press-fitting head, the plurality of displacement sensors being configured to sense displacement of the plurality of pin members and to output a sensing signal to a controller.

19. The apparatus of claim 18, wherein the controller is configured to:

analyze the sensing signals obtained from the plurality of displacement sensors to extract position values of a plurality of tooling holes formed in the at least one rotor core module; and compare the position values with a preset reference value to determine whether the at least one rotor core module is located at a predetermined position.

20. A rotor assembling method using the apparatus for assembling a rotor for a drive motor according to claim 1, the rotor assembling method comprising:

fixing a shaft through a shaft fixing unit;

loading at least one rotor core module to an upper portion of the shaft;

gripping the at least one rotor core module through a core gripper;

vision-photographing the at least one rotor core module through a main vision sensor;

rotating the at least one rotor core module at a set skew angle through a core rotating unit, based on vision data from the main vision sensor; and press-fitting the at least one rotary core module to the shaft through a core press-fitting unit.

* * * * *